(12) United States Patent
Huang et al.

(10) Patent No.: US 12,190,258 B2
(45) Date of Patent: Jan. 7, 2025

(54) METHOD AND SYSTEM FOR REMOTE RESERVATION CONTROL OF DEVICE BASED ON DATA COMMAND FRAME

(71) Applicant: Intex Marketing Ltd., Tortola (VG)

(72) Inventors: Zhi Xiong Huang, Fujian (CN); Ying Biao Zhang, Fujian (CN)

(73) Assignee: Intex Marketing Ltd., Tortola (VG)

( * ) Notice: Subject to any disclaimer, the term of this patent is extended or adjusted under 35 U.S.C. 154(b) by 15 days.

(21) Appl. No.: 18/265,949

(22) PCT Filed: Dec. 10, 2021

(86) PCT No.: PCT/IB2021/061591
§ 371 (c)(1),
(2) Date: Jun. 7, 2023

(87) PCT Pub. No.: WO2022/123534
PCT Pub. Date: Jun. 16, 2022

(65) Prior Publication Data
US 2024/0070560 A1    Feb. 29, 2024

(30) Foreign Application Priority Data

Dec. 10, 2020   (CN) .......................... 202011457386.0

(51) Int. Cl.
*G06Q 10/02*    (2012.01)
*G06Q 10/109*    (2023.01)

(52) U.S. Cl.
CPC ........... *G06Q 10/02* (2013.01); *G06Q 10/109* (2013.01)

(58) Field of Classification Search
CPC .............................. G06Q 10/02; G06Q 10/109
See application file for complete search history.

(56) References Cited

U.S. PATENT DOCUMENTS

2009/0074010 A1* 3/2009 Kwon ..................... H04L 1/007
  370/474
2009/0122767 A1* 5/2009 Kwon ................... H04L 1/1685
  370/337

(Continued)

FOREIGN PATENT DOCUMENTS

WO    2018/217742    11/2018

OTHER PUBLICATIONS

International Search Report and Written Opinion as issued by the International Searching Authority, dated Apr. 12, 2022, for International Patent Application No. PCT/IB2021/061591; 11 pages.

(Continued)

*Primary Examiner* — Jeff Zimmerman
*Assistant Examiner* — Wayne S. Murray
(74) *Attorney, Agent, or Firm* — Faegre Drinker Biddle & Reath LLP

(57) ABSTRACT

The present application proposes a method and a system for constructing a data command frame for remote reservation control, by setting a first byte representing a reserved working time start point, a second byte representing one-time working duration, a third byte representing the reservation status of a whole working cycle, the whole working cycle is divided into several time units, the third byte includes several bits corresponding to several time units, and assigns the value of each bit to determine whether the time units corresponding to each bit is reserved as working time; then combining the first byte, the second byte and the third byte to construct data command frame, and sending the command frames to device to realize remote control. This method enables remote reservation setting on the management of places like spa pools, which is safer and more convenient for spa management staff, and can greatly (Continued)

improve working efficiency and reduce the probability of error.

8 Claims, 3 Drawing Sheets

(56) References Cited

U.S. PATENT DOCUMENTS

| | | | | |
|---|---|---|---|---|
| 2012/0195301 A1* | 8/2012 | Choi | ............... | H04L 1/0083 |
| | | | | 370/328 |
| 2013/0067229 A1* | 3/2013 | German | ............ | H04L 63/0846 |
| | | | | 713/171 |
| 2020/0333813 A1* | 10/2020 | Goldman | ............ | G05B 13/048 |

OTHER PUBLICATIONS

International Preliminary Report on Patentability issued by the International Bureau of WIPO, mailed Jun. 13, 2023, for International Patent Application No. PCT/IB2021/061591; 10 pages.

* cited by examiner

| Byte | Constituent | Data Send |
|---|---|---|
| 5 | Data | Validity of the first reservation function, the validity of different modes of different values such as 0x66 and 0x77, 0x00 means closed |
| 6-7 | Data | Time of the first reservation, containing the hours and minutes in the time point of the first reservation and hour mode of time cycle corresponding to the duration of the reservation and the duration of the working time. |
| 8 | Data | The duration of the working time of the first reservation. |
| 9 | Data | The flag of the whole working cycle of the first reservation. |
| 11-15 | Data | The second reservation |
| 16-20 | Data | The third reservation |
| 21-25 | Data | The forth reservation |
| 26-30 | Data | The fifth reservation |
| 31-35 | Data | The sixth reservation |
| 36-40 | Data | The seventh reservation |

FIG. 6

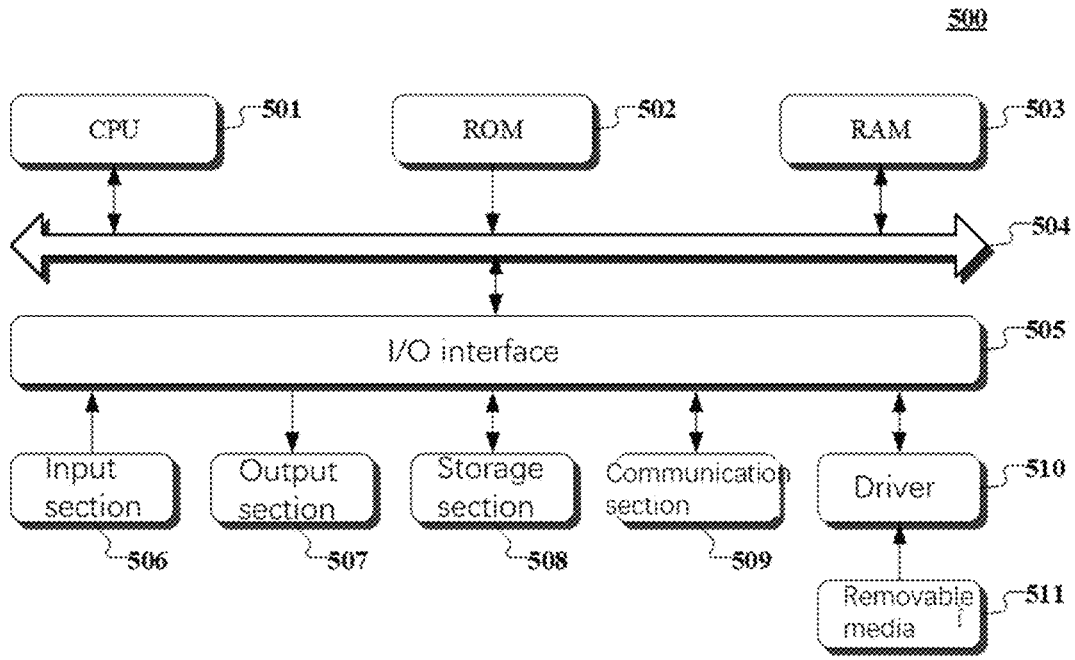

FIG. 7

METHOD AND SYSTEM FOR REMOTE RESERVATION CONTROL OF DEVICE BASED ON DATA COMMAND FRAME

RELATED APPLICATIONS

The present application is a national stage entry of International (PCT) Patent Application Number PCT/IB2021/061591, filed Dec. 10, 2021, which claims priority to Chinese Application No. CN202011457386.0, filed Dec. 10, 2020, the entire disclosures of which are expressly incorporated by reference herein.

TECHNICAL FIELD

The present application relates to communication technology field, particularly relates to method and system for remote reservation control of device based on data command frame.

BACKGROUND ART

With the development of the economic society and the flourishing of Internet+, online reservation service software has been widespread, it is very convenient to reserve the time with help of reservation function of the Internet when people want to experience service consumption.

Spa pool is an essential spa facility of health centers, senior hotels and hot spring resorts. A variety of spa pool appeared with the improvement of people's living standards. SPA means using water resources combining bathing, massage, physical care products and aromatherapy to promote metabolism, to satisfy the body's vision, taste, touch, smell and thinking, and eventually to achieve a physical and mental pleasure.

At present, in the scenario of reservation, the existing technology only focuses on the management of customer resources, while unified time management and reservation arrangements are lacking. In addition, in various existing service information systems, various service resources are usually managed separately as user service time management and pool opening time management. However, it is insufficient in the spa pool time reservation management such as heating time reservation setting, filtration function reservation setting and salt electrolysis function reservation setting. Moreover, it is not capable to make remote reservation setting on spa pools management, which is extremely inconvenient for spa management staff, whose working efficiency is greatly reduced.

Therefore, it is necessary to provide a method that allows remote reservation setting for places like spa pools, swimming pools, etc.

SUMMARY

The present application proposes a method for remote reservation control of device based on data command frame, which may address the technical problems in the prior art that insufficiency in the spa pool time reservation management, incapable of remote reservation setting on spa pools management and inconvenience for management staff.

In one aspect, the present application proposes a method for constructing a data command frame for remote control, comprising the following steps:

Setting a first byte representing a reserved working time start point, the first byte comprising data bits representing the reserved working time start point;

Setting a second byte representing one-time working duration, the one-time working duration representing the working duration of the device in a time unit; setting the reservation time start point and the working duration, respectively, enables the MCU to make a reservation timing based on this time point and working duration;

Setting a third byte representing the reservation status of a whole working cycle, the whole working cycle is divided into several time units, the third byte includes several bits corresponding to the several time units respectively, and value of each bit of the several bits is assigned to determine whether the time unit corresponding to each bit is reserved as working time; this byte can represent the reservation status of the whole working cycle, and set a one-time reservation task or a cyclic task in the working interval and the non-working interval within a week of 168 hours or a day of 24 hours.

Combining the first byte, the second byte and the third byte to construct the data command frame.

Preferably, wherein the data bits representing the reserved working time start point include data bits representing the hour and data bits representing the minute, the hours and the minutes constitute the reserved working time start point. Setting up like this makes the timing accurate down to minutes.

Preferably, wherein the whole working cycle is one week, and the time unit is one day in one week, one-time working duration represents several hours in one day. Setting up like this facilitates the cyclic reservation task in specific hours during one week, making the operation easier and faster.

Preferably, wherein the whole working cycle is one week, and the time unit is one hour, the one-time working duration represents several minutes in one hour. Setting up like this facilitates the cyclic reservation task in specific minutes during one week, making the operation easier and faster.

According to the second aspect of the present application, a method for remote reservation control of device based on a data command frame is proposed, the method comprising:

S301: constructing the data command frame using the above-described method for remote reservation control;

S302: sending the data command frame to device; and

S303: the device parses the data command frame after receiving the data command frame so as to periodically execute the working instructions in the data command frame.

Preferably, step S301 comprises repeatedly constructing a number of data command frames to implement a number of reservation working modes and send a number of data command frames to the device in step S302.

According to the third aspect of the present application, a computer readable storage medium is proposed, on which one or more computer programs are stored, the one or more computer programs implement the above method when executed by computer processor.

According to the fourth aspect of the present application, a system for remote reservation control of a device based on a data command frame is proposed, which comprises:

A data command frame constructing unit: configured to construct data command frame using the method for constructing the data command frame for remote control described above;

A data frame sending unit: configured to send data command frame to device;

A data frame receiving unit: configured to parse the data command frame after the device received the data command frame and to periodically execute the working instructions in the data command frame.

The present application proposes a method for remote reservation control of device based on data command frame, by setting a first byte representing a reserved working time start point, a second byte representing one-time working duration, and a third byte representing the reservation status of the whole working cycle, here the whole working cycle is divided into several time units, the third byte includes several bits corresponding to several time units respectively, and assigns the value of each bit to determine whether the time unit corresponding to each bit is reserved as working time; combining the first byte, the second byte and the third byte to construct data command frame, then the command is sent to device to realize remote control. Advantages, among others, of this method are that it enables remote reservation setting on the management of places like spa pools, which is safer and more convenient for spa management staff, and can greatly improve working efficiency and reduce the probability of error.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

The accompanying drawings are included to provide a further understanding of the embodiments and incorporated as part of this application. The accompanying drawings illustrate embodiments and are used in conjunction with the description to explain the principles of the application. Many of the anticipated advantages of embodiments will be better recognized, as they become better understood by reference to the following detailed description. Other features, objects and advantages of the present application will become more apparent by reading the detailed description of the non-limiting embodiments made with reference to the following accompanying drawings.

FIG. 6 is a WIFI module sending reservation function and time data packets contents in an embodiment of the present application;

FIG. 7 is a schematic diagram of the structure of an electronic device of computer system suitable for implementing embodiments of the present application.

Figure 1:
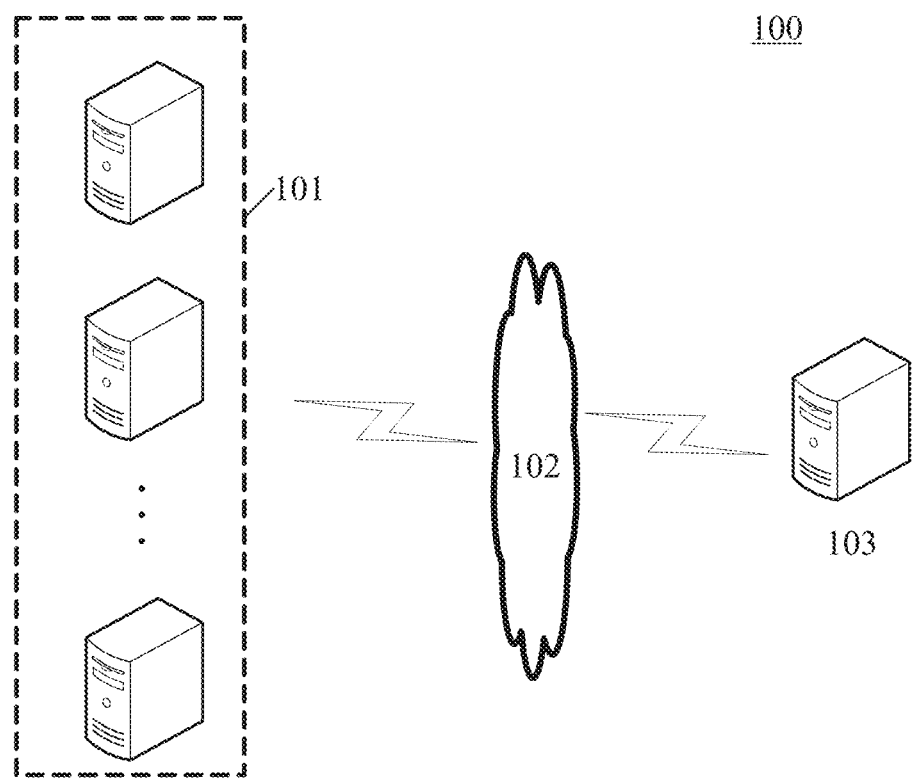
FIG. 1 is a diagram of an exemplary system architecture which the present application may apply.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF EMBODIMENTS

The present application is described in further detail below with the accompanying drawings and embodiments. It's understood that the specific embodiments described herein are intended only to explain the present application and not to limit it. It is also to be noted that, for ease of description, only those portions related to the application are shown in the accompanying drawings.

It is to be noted that the embodiments and the features in the embodiments of the present application can be combined with each other when not conflicting. The present application will be described in detail below with reference to the accompanying drawings and in connection with the embodiments.

FIG. 1 illustrates an exemplary system architecture 100 to which the method for remote reservation control of device based on a data command frame that can be applied to an embodiment of the present application.

As shown in FIG. 1, the system architecture 100 may include data server 101, network 102, and master server 103. The network 102 is a medium to provide a communication connection between the data server 101 and the master server 103. The network 102 may include various connection types, such as wired, wireless communication links, fiber optic cables, and others.

The master server 103 may be a server providing various services, such as a data processing server that processes the information uploaded by the data server 101. The data processing server can perform remote reservation data processing.

It should be noted that the method for performing remote reservation control of device based on a data command frame provided in this embodiment of the present application is generally performed by the master server 103, and accordingly, the device for remote reservation control of facilities based on a data command frame is generally installed in the master server 103.

It should be noted that the data server and the master server can be hardware or software. When they are hardware, it can be implemented as a distributed server cluster consisting of multiple servers, or it can be implemented as a single server. When they are software, they can be implemented as multiple software or software modules (e.g., software or software modules used to provide distributed services), or as a single software or software module.

It should be understood that the number of data servers, networks and master servers in FIG. 1 is only schematic. It is possible to have any number of end devices, networks, and servers depending on the implementation needs.

Figure 2:
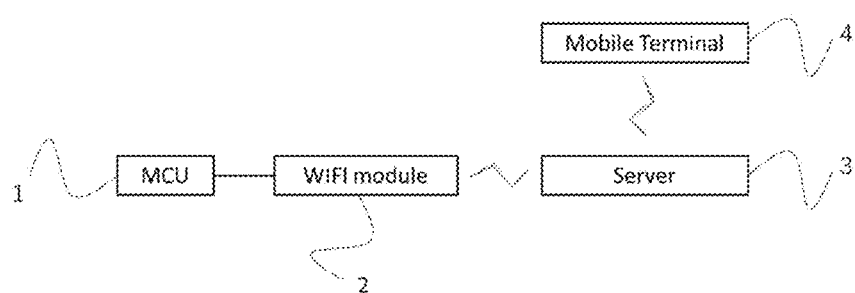
FIG. 2 is a schematic diagram of an embodiment of the present application in which an MCU and a mobile terminal are in communication.

As shown in FIG. 2, the mobile terminal 4 (cell phone, tablet, etc.) and the wireless router are in different networks, and the WIFI module 2 is responsible for uploading the relevant data to the server 3. At this time, the communication between electronic devices such as the mobile terminal 4 and the WIFI module 2 is forwarded through the server 3, and the MCU 1 establishes communication with the wireless module 2, and then controls the facilities to achieve remote control.

Figure 3:
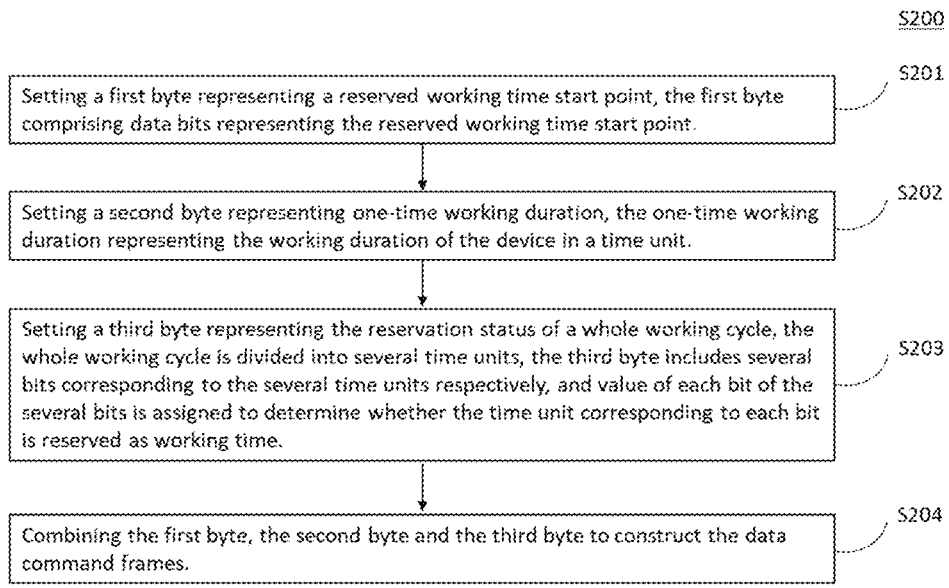
FIG. 3 is a flowchart of a method for constructing data command frame for remote control in an embodiment of the present application.

In a specific embodiment, FIG. 3 illustrates a flow chart of a method for constructing a data command frame for remote control according to an embodiment of the present application. The method comprises the following steps:

S201: Setting a first byte representing a reserved working time start point, the first byte comprising data bits representing the reserved working time start point. Wherein the data bits representing the reserved working time start point may include data bits representing the hour and data bits representing the minute, hours and minutes constitute the working time start point. It should be understood that the first byte does not indicate one byte only. There may be, respectively, a first byte including data bits indicating hours and a second byte including data bits indicating minutes, or there may be a byte including both data bits indicating hours and data bits indicating minutes.

S202: Setting a second byte representing one-time working duration, the one-time working duration representing the working duration of the device in a time unit.

S203: Setting a third byte representing the reservation status of a whole working cycle, the whole working cycle is divided into several time units, the third byte includes several bits corresponding to the several time units respectively, and value of each bit of the several bits is assigned to determine whether the time unit corresponding to each bit is reserved as working time;

In a first preferred embodiment, the whole working cycle is one week, and the time unit is one day in one week, the one-time working duration represents several hours in one day.

In a second preferred embodiment, the whole working cycle is one week, and the time unit is one hour, the one-time working duration represents several minutes in one hour.

S204: Combining the first byte, the second byte and the third byte to construct the data command frame.

It should be understood that there is no logical relationship between S201-S204 in FIG. 3 in terms of the sequence of steps, and any scenario that differs from the above only in the sequence of steps is still comprised in the above scenario.

Figure 4:
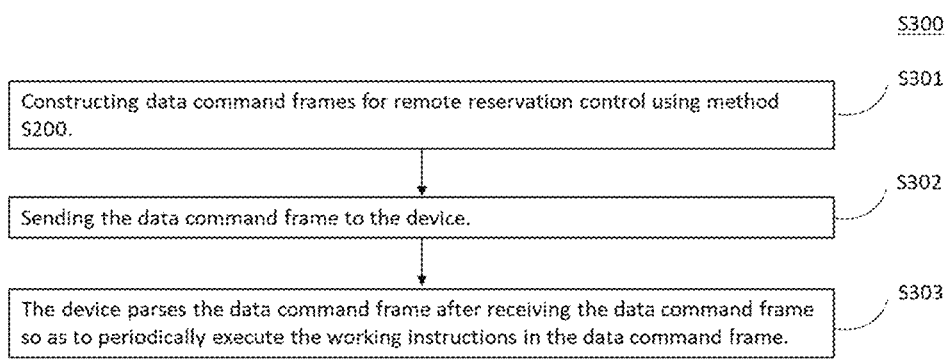
FIG. 4 is a flowchart of a method for remote reservation control of device based on data command frame in an embodiment of the present application.

In a specific embodiment, as shown in FIG. 4, a flowchart of a method for remote reservation control of device based on data command frame comprises:

S301: constructing data command frame using the above-described method for remote reservation control;

S302: sending the data command frame to device; and

S303: the device parses the data command frame after receiving the data command frame so as to periodically execute the working instructions in the data command frame.

Preferably, step S301 comprises repeatedly constructing a number of data command frame to implement a number of reservation working modes and send a number of data command frame to the device in step S302.

Figure 5:
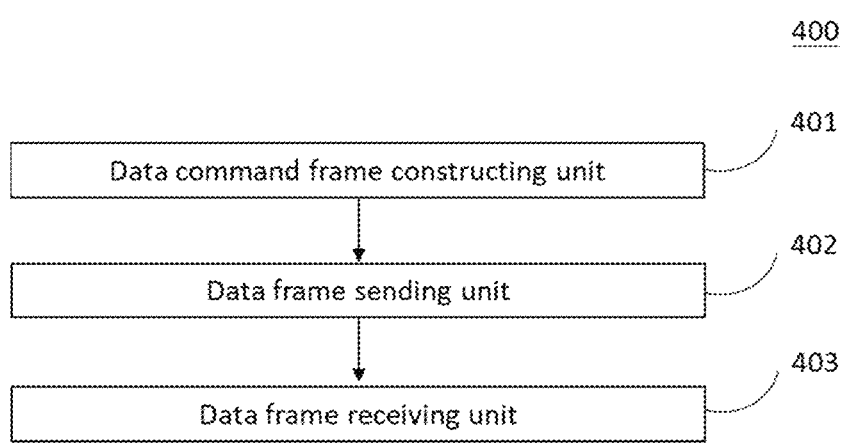
FIG. 5 is a frame diagram of a system for remote reservation of control device based on data command frame in an embodiment of the present application.

As shown in FIG. 5, a system for remote reservation control of a device based on a data command frame 400 is shown. System 400 includes a data command frame constructing unit 401: configured to construct data command frame using the method for constructing data command frame for remote control described above; a data frame sending unit 402: configured to send data command frame to device; and a data frame receiving unit 403: configured to parse the data command frame after the device received the data command frame and to periodically execute the working instructions in the data command frame.

As shown in FIG. 6, the content of the reservation function and the time data packet issued by WIFI module 2 to MCU 1 includes: byte 5, set to represent the validity of reserved working start, wherein the data bit of reserved working time start point is a special value (the validity of different modes of different values such as 0x66 and 0x77), 0x00 means closed.

The first byte includes byte 6 and byte 7, wherein byte 6 and byte 7 contain the hours and minutes in the time point of the first reservation and hour mode of time cycle corresponding to the duration of the reservation and the duration of the working time, for example the special flag bit is 1 means that the first byte will be calculated with the hour mode of time cycle being week-total-hour mode, the hour flag bit is 0 means that the first byte will be calculated with the hour mode of time cycle being 24-hours mode.

Wherein the week-total-hour mode is: the reservation time is scheduled in units of week; 24-hours mode is: the reservation time is scheduled in units of day, the cycle and the one-time working duration are set, according to requirements, one piece of reservation information can be combined by one or several in units of day; the second byte 8 represents the working duration of the device in a time unit, information of the byte 6 and the byte 7 represents the hours and minutes in the time point of the first reservation and hour mode of time cycle corresponding to the length of the reservation and the length of the working time, so as to constitute the reserved working time start point.

The third byte 9 represents the reservation status of the whole working cycle. The whole working cycle is divided into several time units, the third byte 9 includes several bits corresponding to several time units respectively, and assigns the value of each bit to determine whether the time unit corresponding to each bit is reserved as working time. For example, certain bits in the third byte 9, e.g., bit 0-bit 4 represent a total of multiple interval work flag bits in the N days—(N+1) days interval or N weeks—(N+1) weeks interval, respectively (N is 0, 1, 2, 3, respectively). In each bit representing the corresponding time interval sets non-work or work time zone). In addition, the third byte 9 contains one or more special flag bits indicating the overall reservation status, to indicate whether it is a no-reservation, one-time reservation task or a cyclic reservation task.

The packet may contain multiple reservation instructions, e.g., byte 11-byte 15 for the second reservation instruction, byte 16-byte 20 for the third reservation instruction, byte 21-byte 25 for the fourth reservation instruction and many other reservation instructions. Different reservation instructions can be set at the same time, which means that multiple reservation instructions can be set at once and can be operated in parallel, and the time slots that have been reserved will not be reserved again.

Here, referring to FIG. 7, shows a schematic diagram of the structure of an electronic device of computer system 500 suitable for implementing an embodiment of the present application. The electronic device illustrated in FIG. 7 is only an example and does not impose any limitations on the functionality and usable range of the embodiments in the present application.

As shown in FIG. 7, the computer system 500 includes a central processing unit (CPU) 501 that can perform various appropriate actions and processes based on a program stored in a read-only memory (ROM) 502 or loaded from a storage portion 508 into a random-access memory (RAM) 503. In RAM 503, various programs and data required for the operation of system 500 are also stored. CPU 501, ROM 502, and RAM 503 are connected to each other via bus 504. The input/output (I/O) interface 505 is also connected to bus 504.

The following components are connected to the I/O interface 505: an input section 506 including a keyboard, mouse, etc.; an output section 507 including, for example, a liquid crystal display (LCD), etc. and speakers, etc.; a storage section 508 including a hard disk, etc.; and a communication section 509 including a network interface card such as a LAN card, modem, etc. The communication section 509 performs communication processing via a network such as the Internet. Driver 510 is also connected to I/O interface 505 as needed. Removable media 511, such as disks, CDs, magnetic disks, semiconductor memory, and the like, is mounted on driver 510 as needed so that computer programs read from it can be installed into storage section 508 as needed.

Particularly, according to embodiments of the present disclosure, the process described above reference flowchart may be implemented as a computer software program. For example, embodiments of the present disclosure include a computer program product comprising a computer program carried on a computer readable storage medium, the computer program comprising program code for performing the method shown in the flowchart. In such an embodiment, the computer program may be downloaded and installed from a network via communication section 509, and/or installed from removable medium 510. When this computer program is executed by the central processing unit (CPU) 501, the above-described functions are performed as defined in the method of the present application. It is to be noted that the computer readable storage medium of the present application may be a computer readable signal medium or a computer readable storage medium or any combination of both of the above. The computer-readable storage medium may, for example, be—but is not limited to—an electrical, magnetic, optical, electromagnetic, infrared, or semiconductor system, device, or apparatus, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, magnetic memory devices, or any suitable combination of the above. In this application, the computer-readable storage medium may be any tangible medium that contains or stores a program that may be used by or in combination with an instruction execution system, device, or apparatus. And in the present application, the computer-readable signaling medium may include a data signal propagated in the baseband or as part of a carrier wave that carries computer-readable program code. Such propagated data signals may take a variety of forms, including but not limited to electromagnetic signals, optical signals, or any suitable combination of the above. The computer-readable signal medium may also be any computer-readable storage medium other than the above computer-readable storage medium that sends, propagates, or transmits a program for use by or in combination with an instruction execution system, device, or apparatus. The program code contained on the computer-readable storage medium may be transmitted in any suitable medium, including but not limited to: wireless, wire, fiber optic cable, RF, etc., or any suitable combination of the above.

Computer program code for performing the operations of the present application may be written in one or more programming languages or combinations thereof, including object-oriented programming languages—such as Java, Smalltalk, C++, and also including conventional procedural programming languages—such as "C" language or similar programming languages. The program code may be executed entirely on the user's computer, partially on the user's computer, as a separated package, partially on the user's computer and partially on a remote computer, or entirely on a remote computer or server. In the case involving a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible architectures, functions, and operations of the systems, methods, and computer program products in accordance with various embodiments of the present application. Regarding this, each box in a flowchart or block diagram may represent a module, program segment, or section of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the reversed order, which depends on the function involved. It should also be noted that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The modules described in the embodiments in this application can be implemented by software or by hardware.

In another aspect, the present application also provides a computer readable storage medium, which may be contained in the electronic devices described in the above embodiments; or may be separately exist and not assembled into the electronic device. The above-mentioned computer readable storage medium carries one or more programs, and when the above-mentioned one or more programs are executed by the electronic device, the electronic device will: setting a first byte representing a reserved working time start point, the first byte includes data bits indicating the reserved working time start point; setting a second byte representing one-time working duration, the one-time working duration indicating the working duration of the facility in a time unit; setting a third byte representing the reservation situation of a whole working cycle, the whole working cycle is divided into several time units, the third byte includes several bits corresponding to several time units respectively, and assigns the value of each bit to determine whether the time unit corresponding to each bit is reserved as working time; combining the first byte, the second byte and the third byte to form a data command frame; sending the data command frame to a device.

The above description is only a preferred embodiment of the present application and an illustration of the technical principles employed. It should be understood by those skilled in the art that the scope of the invention covered by the present application is not limited to the technical solution resulting from a particular combination of the above technical features, but should also cover other technical solutions resulting from any combination of the above technical features or their equivalent features without departing from the above application concept. For example, the technical solutions formed by replacing the above features with the technical features with similar functions disclosed (but not limited to) in this application.

The invention claimed is:

1. A method for constructing a data command frame for remote control, wherein the method comprises the following steps:

setting a first byte representing a reserved working time start point, the first byte comprising data bits representing the reserved working time start point;

setting a second byte representing a one-time working duration, the one-time working duration representing a working duration in a time unit;

setting a third byte representing a reservation status of a whole working cycle, the whole working cycle is divided into several time units, the third byte includes several bits corresponding to the several time units respectively, and a value of each bit of the several bits is assigned to determine whether the time unit corresponding to each bit is reserved as working time;

combining the first byte, the second byte and the third byte to construct the data command frame.

2. The method for constructing data command frame for remote control according to claim 1, wherein the data bits representing the reserved working time start point include data bits representing the hour and data bits representing the minute, and the hours and the minutes constitute the working time start point.

3. The method for constructing data command frame for remote control according to claim 1, the whole working cycle is one week, and the time unit is one day in one week, the one-time working duration represents several hours in one day.

4. The method for constructing data command frame for remote control according to claim 1, the whole working cycle is one week, and the time unit is one hour, the one-time working duration represents several minutes in one hour.

5. A method for remote reservation control of a device based on a data command frame, wherein the method comprises the following steps:

(a): constructing the data command frame using the method for constructing data command frame for remote control according to claim 1;

(b): sending the data command frame to the device; and (c): the device parses the data command frame after receiving the data command frame so as to periodically execute working instructions in the data command frame.

6. The method for remote reservation control of device based on data command frame according to claim 5, wherein the step (a) comprises repeatedly constructing a number of data command frames to implement a number of reservation working modes, and in step (b) a number of data command frames are sent to the device.

7. A non-transitory computer readable storage medium, which implements the method according to claim 1 when executed.

8. A system for remote reservation control of a device based on a data command frame, wherein the system is configured to:

construct a data command frame using the method for constructing the data command frame for remote control according to claim 1;

send the data command frame to the device; and parse the data command frame after the device received the data command frame and to periodically execute working instructions in the data command frame.

* * * * *